United States Patent [19]

Watanabe

[11] Patent Number: 4,540,061

[45] Date of Patent: Sep. 10, 1985

[54] DRIVE ARRANGEMENT FOR THREE WHEELED VEHICLES

[75] Inventor: Hiromitsu Watanabe, Iwata, Japan

[73] Assignee: Yamaha Hatsudoki Kabushiki Kaisha, Iwata, Japan

[21] Appl. No.: 475,838

[22] Filed: Mar. 16, 1983

[30] Foreign Application Priority Data

Mar. 29, 1982 [JP] Japan .................. 57-50387
Nov. 19, 1982 [JP] Japan ................. 57-203188

[51] Int. Cl.³ ............................................. B62D 61/06
[52] U.S. Cl. .................................... 180/215; 180/73.1
[58] Field of Search ............ 180/210, 215, 226, 73 R; 280/282, 283, 284, 296

[56] References Cited

U.S. PATENT DOCUMENTS 4,336,859  6/1982  Leitner ............................ 180/226
4,392,536  7/1983  Iwni et al. ....................... 280/282

FOREIGN PATENT DOCUMENTS 600287  11/1959  Italy ................................. 180/215
539143   8/1941  United Kingdom .............. 180/226

Primary Examiner—Joseph F. Peters, Jr.
Assistant Examiner—Ross Weaver
Attorney, Agent, or Firm—Ernest A. Beutler

[57] ABSTRACT

A three wheeled shaft driven off the road vehicle having an improved driving arrangement. The driving arrangement includes an overload release coupling that is positioned between the driven gear and a drive shaft that drives the rear wheels so as to minimize the complexity of the transmission and to protect the engine and drive. A trailing arm rear suspension is employed that has widely spaced bearings for rotatably journaling the rear axle to minimize unit loadings. An arrangement is also disclosed for facilitating axial positioning of the driven gear on the output shaft without necessitating the use of shims.

33 Claims, 4 Drawing Figures

DRIVE ARRANGEMENT FOR THREE WHEELED VEHICLES

BACKGROUND OF THE INVENTION

This invention relates to three wheeled vehicles and more particularly to an improved drive arrangement for such vehicles.

Three wheeled vehicles presently enjoy large popularity for off the road use. Such vehicles normally include a steerable front wheel and a pair of driven rear wheels. Large low pressure tires are mounted on all of the wheels to facilitate use in a wide variety of terrains. Because of their off the road use, these vehicles are subjected to considerable stress. Because they are operated off the road, however, they should be readily durable so that they will not fail in a remote location. One area where such units are highly stressed is in the mounting and driving arrangement for the rear wheels.

It is, therefore, a principal object of this invention to provide an improved arrangement for supporting the rear wheels of a three wheeled vehicle.

It is another object of this invention to provide an axle arrangement for a three wheeled vehicle wherein the unit loading is substantially reduced from prior art devices.

Again, because of the extreme use to which off the road three wheeled vehicles is put, it is important to provide some device for preventing damage to the transmission and/or engine under extreme conditions. Although it has been proposed to employ an overload release mechanism in the drive train of a vehicle so as to minimize such damages, the overload release devices previously proposed have resulted in increased complexity of the drive train and/or transmission It is, therefore, a still further object of this invention to provide an improved driving arrangement for a three wheeled vehicle.

It is a further object of this invention to provide a three wheeled vehicle drive arrangement that embodies an improved, simplified overload release mechanism.

In many types of arrangements, it is desirable and necessary to provide accurate location for the axial position of a rotating element. For example, in bevel gear drives or similar gearing arrangements, the axial position of the gears to maintain the proper meshing relationship is critical. It is normally the practice to employ shims for adjusting the axial position of the gears. The use of shims for this purpose not only complicates assembly, but also presents problems during servicing.

It is, therefore, a further object of this invention to provide an improved and simplified arrangement for axially locating a rotating element.

It is a further object of this invention to provide an improved and simplified arrangement for maintaining the desired relationship between a pair of meshing gears.

SUMMARY OF THE INVENTION

A first feature of this invention is adapted to be embodied in a transmission for a three wheeled vehicle or the like comprising a frame, a front wheel dirigibly carried by the frame, a pair of rear wheels carried by the frame, an engine carried by the frame, and a transmission that transmits the drive from the engine to the rear wheels. In accordance with this feature of the invention, the engine is positioned with its output shaft extending parallel to the axis of rotation of the rear wheels. The transmission has a primary shaft and a secondary shaft each of which carry intermeshing gears for changing the speed ratio between the primary and secondary shafts. The transmission shafts have their rotational axes extending parallel to that of the rear wheels. Means are provided for driving the primary shaft from the engine output shaft. A drive shaft is incorporated for driving the rear wheels and which extends generally perpendicular to the axis of rotation of the rear wheels. Means including an overload release device drive the drive shaft from the transmission secondary shaft.

Another feature of the invention is adapted to be embodied in a three wheeled vehicle or the like having a frame, a front wheel dirigibly supported by the frame, trailing arm means consisting of a pair of spaced apart arm members that are pivotally supported on the frame at one end and which rotatably support an axle at their other end. A pair of rear wheels are affixed for rotation with the axle and power means carried by the frame drive the axle. In accordance with this feature of the invention, the trailing arm means carry a pair of spaced apart bearing members for journaling the axle in proximity to the rear wheels for minimizing unit loading thereupon.

Another feature of this invention is adapted to be embodied in an arrangement for obtaining and maintaining a predetermined axial location for a rotating member. This arrangement includes bearing means that define an axis of rotation of the member and deformable spacer means interposed between the bearing means and the member for determining the relative position therebetween. Means are provided for effecting movement of the rotatable member relative to the bearing means for permanently deforming the deformable member to establish the final position of the rotating member relative to the bearing means.

DETAILED DESCRIPTION OF THE PREFERRED EMBODIMENT

Figure 1:
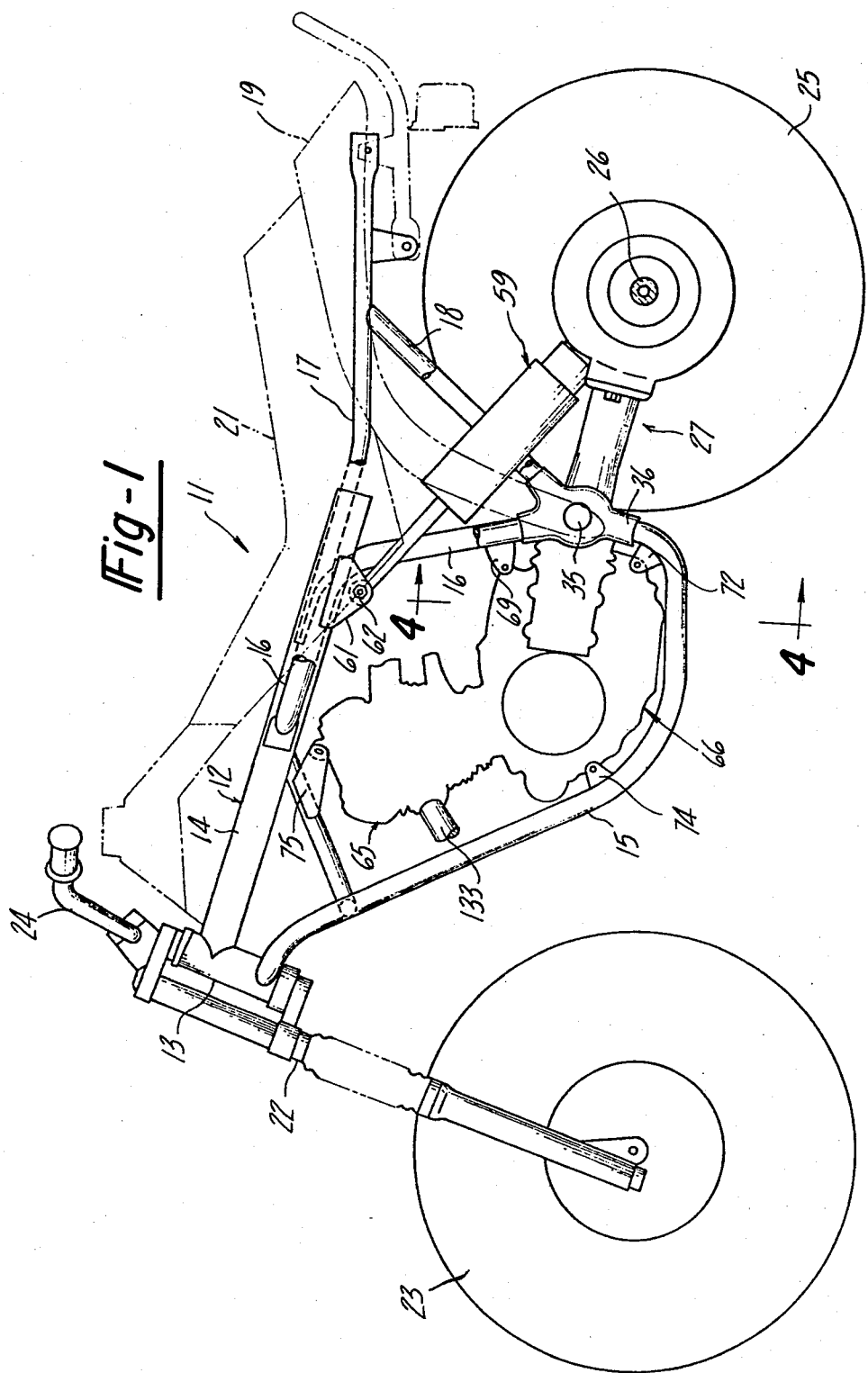
FIG. 1 is a side elevational view of a three wheeled vehicle constructed in accordance with an embodiment of the invention, with portions of the vehicle shown in phantom.
Figure 2:
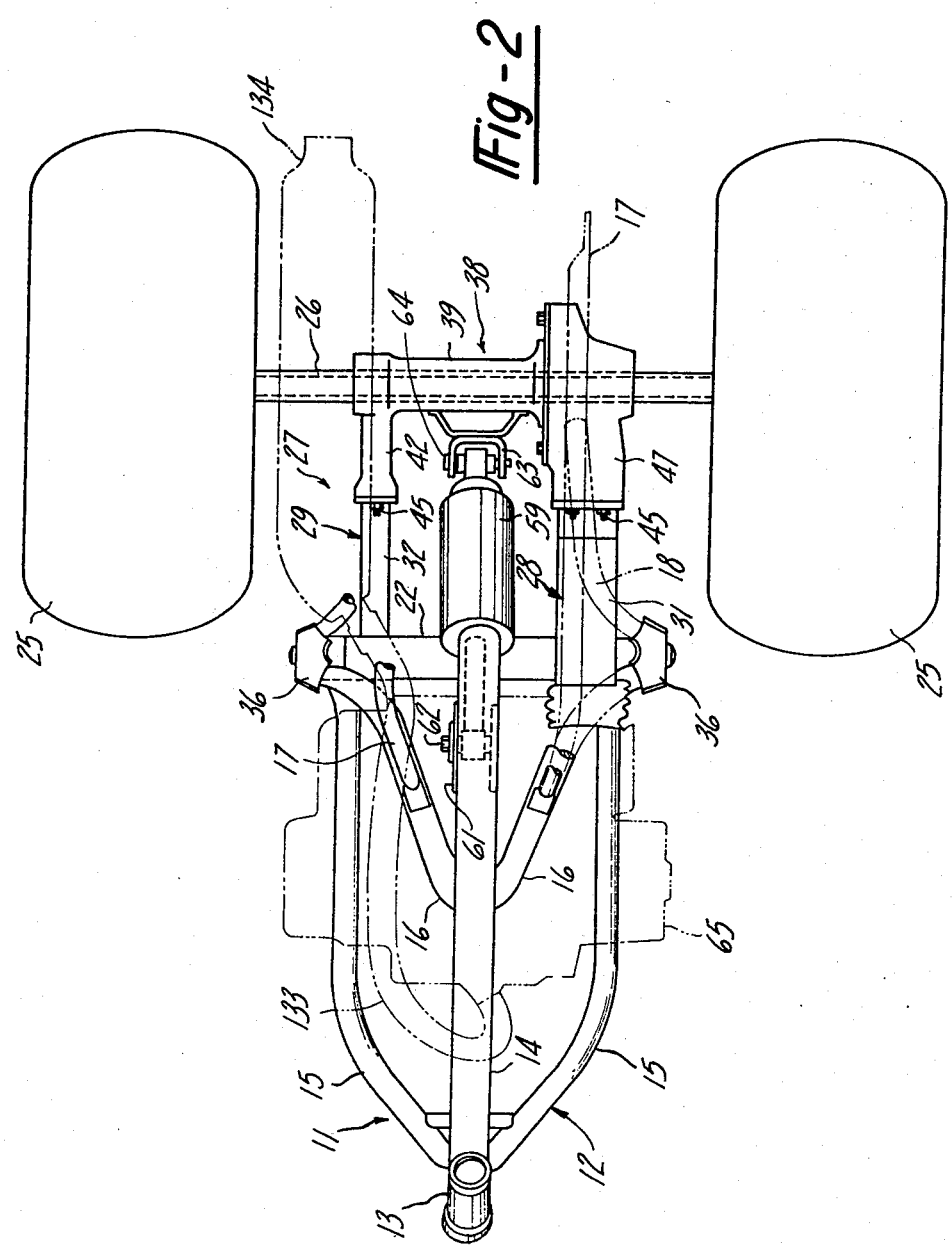
FIG. 2 is a top plan view of the rear portion of the vehicle, with certain components deleted and with other components shown in phantom.

A three wheeled vehicle constructed in accordance with this invention is identified in the drawings generally by the reference numeral 11. The vehicle 11 includes frame means, which in the illustrated embodiment comprises a tubular frame assembly, indicated generally by the reference numeral 12. When the term "frame means" is used in this specification and in the claims, it is intended to include any of the known type of frame structures including unitary or so-called frameless constructions.

The frame 12 consists of a head pipe 13, a main tube 14 and a pair of down tubes 15. The down tubes 15 are reversely bent at their lower ends and these ends are affixed, in a manner to be described, to upstanding seat pillar tubes 16. The down tubes 15 and seat pillar tubes 16 result in a frame of what is known as the double cradle construction. A pair of seat rails 17 are affixed to the seat pillar tubes 16 adjacent their point of connection with the main tube 14 and extend rearwardly. The seat rails 17 are supported contiguous to their trailing ends by means of a pair of back stays 18 that extend from the seat pillar tubes 16 and which are affixed thereto and to the seat rails 17.

A body, of any known type, is supported on the frame assembly 12 in a known manner. Since the body forms no portion of the invention, it has been shown only in phantom and is identified generally by the reference numeral 19. The body 19 in turn supports a seat 21.

A front fork assembly 22 is journaled by the head pipe 13 in a known manner. A front wheel, mounting a tire of the balloon low pressure type 23, is suitably jounrnaled at the lower end of the fork assembly 22. If desired, the fork assembly 22 may employ a suspension device for permitting suspension movement of the wheel 23 relative to the frame assembly 12. In addition, the wheel 23 may be steered by means of a handlebar assembly 24 that is affixed to the fork 22 in a known manner.

A pair of rear wheels carry balloon, low pressure tires 25. The rear wheels are affixed in a suitable manner to a rear axle 26, which axle is, in turn, journaled in a manner to be described by a trailing arm assembly, indicated generally by the reference numeral 27. The trailing arm assembly 27 in addition to rotatably supporting the axle 26 supports the axle 26 and rear wheels including the tires 25 for suspension movement relative to the frame assembly 12. The manner in which this is done will become more apparent as this description proceeds.

The trailing arm assembly 27 includes a pair of transversely spaced apart arm members 28 and 29. The arm members 28 and 29 comprise respective forward tubular parts 31 and 32. The parts 31 and 32 have a generally open configuration and for a reason to be described, the part 31 is substantially larger than the part 32. The forward ends of the tubular parts 31 and 32 are affixed to a tubular cross tube 33. The cross tube 33, in turn, carries spaced bearings 34 at its opposite ends which rotatably support the trailing arm assembly 27 at its forward end on a pair of stub shafts 35. The stub shafts 35 are, in turn, carried by bracket plates 36 which are affixed, as by welding, to the down tubes 15 and seat pillar tubes 16 and which brackets also connect these tubes. The stub shafts 35 are held in assembled relationship by cap screws 37. Upon removal of the screws 37, the trailing arm assembly 27 and supported wheels and tires 25 may be removed as a unit from the vehicle 11 for servicing.

It should be noted that the bearings 34 are spaced transversely apart at a substantial distance so as to lend stability to the vehicle 11. Preferably, the bearings 34 are disposed closely adjacent the outer side periphery of the vehicle 11. In a like manner, the arm members 28 and 29 are spaced apart a substantial transverse distance, for a reason to be described.

A final drive housing assembly, indicated generally by the reference numeral 38, is provided at the rear end and form a part of the trailing arm assembly 27. The final drive housing assembly 38 comprises a main member 39 having a tubular portion that defines a transversely extending opening 41. At one side, the member 39 is provided with a forwardly extending projection 42 that forms a portion of the arm member 29. The tubular portion 32 is provided with an outstanding flange 43 that is affixed to the forward end of the portion 42 by means of studs 44 and nuts 45. Locating surfaces 46 of the studs 44 cooperate with machined openings in the flange 43 so as to permit alignment.

A final drive cover member 47 is affixed to the member 39 by means of a plurality of screws 50. The cover 47 has a forwardly extending portion 48 which forms a part of the arm member 28. A sleeve 49 is telescopically received in the tubular member 31 and is affixed to it, as by welding. The sleeve 49 has an outwardly extending flange 51 that is affixed to the cover member projection 48 by means of studs 52 and nuts 53. The flange 51 has machined openings 54 that cooperate with the studs 52 so as to locate the tubular sleeve 49 accurately relative to the final drive cover member 47.

On the side adjacent the arm member 29, the final drive housing 39 supports a bearing 55. The bearing 55 is positioned adjacent the outer periphery of the housing 39 and in relatively close proximity to the adjacent wheel 25. In a similar manner, the final drive cover member 47 carries a bearing 56 adjacent its outer periphery and in relatively close proximity to the adjacent wheel 25. The bearings 55 and 56 rotatably journal the rear axle 26 at widely transversely spaced points. Because of this wide spacing, the loads exerted on the bearings 55 and 56 by the axle 26 will have little bending moment and unit loadings will be substantially reduced from constructions wherein the rear axle bearings are more closely spaced to each other. Suitable seals 57, 58 are carried outwardly of the bearings 55, 56, so as to protect the bearings 55, 56 and the associated components of the final drive, which are to be described.

It should be readily apparent that the trailing arm assembly 27 supports the rear wheels and tires 25 for pivotal movement relative to the frame 12 about a transversely extending axis, defined by the bearings 34, upon suspension travel. A suspension element, indicated generally by the reference numeral 59, is provided for controlling this suspension travel. The suspension element 59 may be of any known type and preferably comprises a combined shock absorber and enclosed coil spring arrangement. One end of the suspension element 59 is pivotally connected to the frame main tube 14 by means of a bracket 61 and pivot pin 62. The opposite end of the suspension element 59 is connected pivotally to a bracket 63 that is affixed to the final drive housing 39 in a suitable manner, as by welding. The pivotal connection between the suspension element 59 and the bracket 63 is provided by means of a pivot pin 64.

Figure 4:
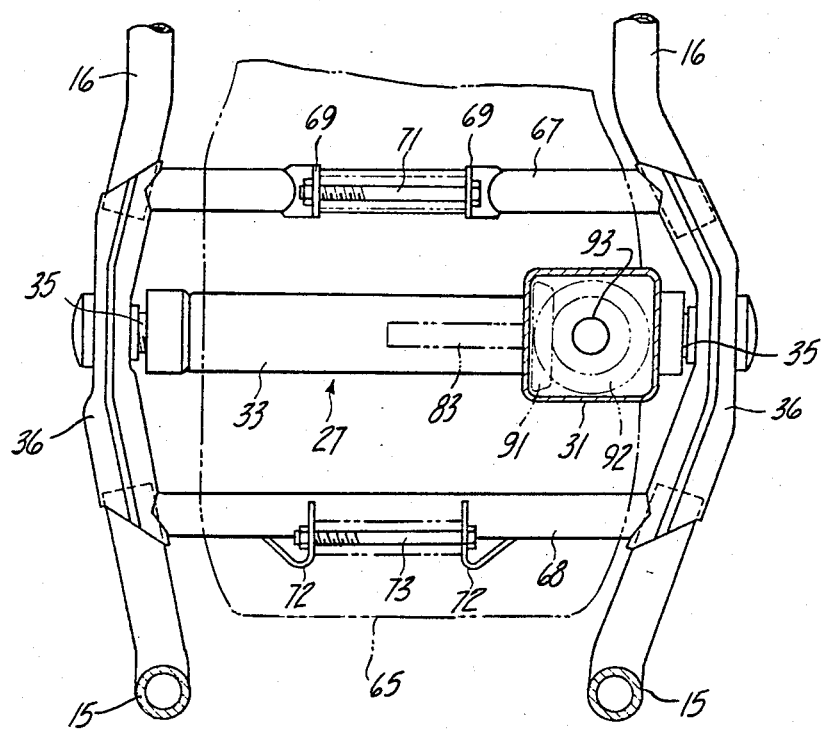
FIG. 4 is an enlarged cross-sectional view taken along the line 4—4 of FIG. 1.

An internal combustion engine, which may be of any known type, indicated generally by the reference numeral 65, is supported within the frame assembly 12 in a manner to be described. The engine 65 includes a combined crankcase transmission assembly 66. As may be seen in FIG. 4, a pair of cross tubes 67 and 68 extend between and are affixed to the seat pillar tubes 16 and down tubes 15, respectively. Brackets 69 are affixed, as by welding, to the cross tubes 67. A bolt assembly 71 extends through and is affixed to the brackets 69 and passes through a cylindrical opening in a boss formed on the engine crankcase and transmission assembly 66 so as to provide a partial support for the engine 65. In a like manner, a pair of brackets 72 are affixed to the cross tube 68. A bolt assembly 73 extends through a similar opening in a boss formed in the lower portion of the transmission crankcase assembly 66 so as to provide further support for the engine 65. Forward brackets 74 and 75 are also affixed to the frame assembly 12 for supporting the forwardmost portion of the engine 65 in a suitable manner.

Figure 3:
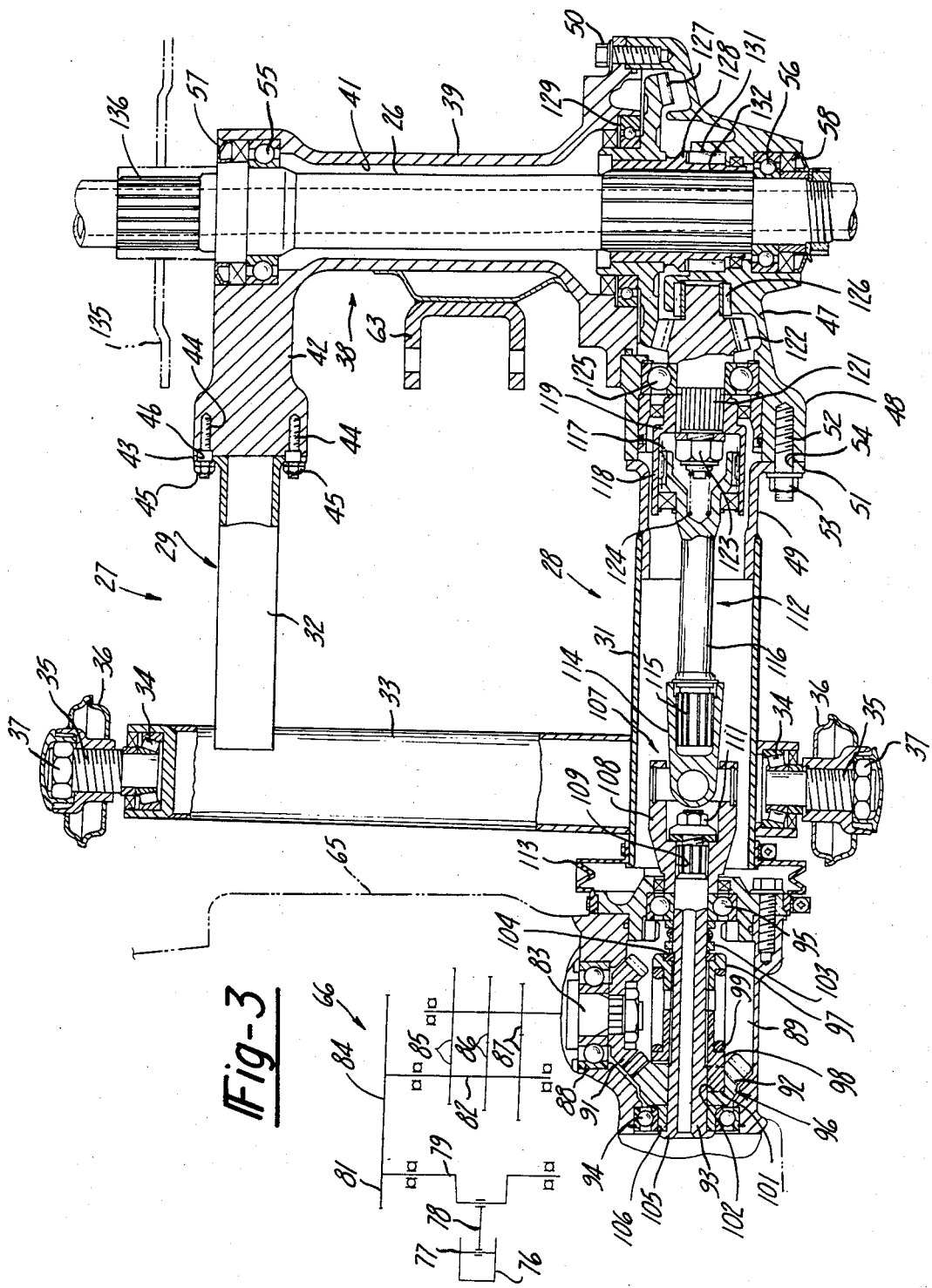
FIG. 3 is a further enlarged top plan view, with portions broken away, other portions shown in section, and still further portions shown schematically, showing the engine, transmission and rear wheel suspension.

Referring now primarily to FIG. 3, the engine 65 and the transmission associated with the crankcase transmission assembly 66 is illustrated schematically. In this schematic illustration, the engine 65 is depicted as being of the single cylinder type including a cylinder 76 in which a piston 77 is supported for reciprocation. The piston 77 is connected by a piston pin to one end of a connecting rod 78. The other end of the connecting rod 78 is journaled upon a throw of a crankshaft 79 that is supported in the crankcase 66 on suitable bearings for rotation about an axis that extends transversely of the vehicle 11 and parallel to the axis of rotation of the rear axle 26. The crankshaft 79 drives a clutch (not shown) which, in turn, drives a transfer gear 81. The transmission 66 includes a primary shaft 82 and a secondary shaft 83. The primary and secondary shafts 82, 83, are journaled in suitable bearings and have their axes of rotation extending parallel to that of the crankshaft 79 and also that of the rear axle 26. Hence, the shafts 79, 82, 83 and axle 26 all rotate about parallel axes.

An input transfer gear 84 is affixed to the primary shaft 82 and is in mesh with the crankshaft driven transfer gear 81 so as to drive the primary transmission shaft 82 from the crankshaft 79 through the aforenoted clutch. A plurality of gear sets 85, 86 and 87 consisting of driving gears that are affixed to the primary shaft 82 and driven gears that are journaled upon the secondary shaft 83 are provided in the transmission 66. As is well known, the driven gears of the gear sets 85, 86 and 87 may be selectively coupled to the secondary shaft 83 so as to provide a speed change driving relationship between the primary and secondary shafts 82, 83.

The rotatable support for the secondary shaft 83 includes a bearing 88 that is supported within the casing of the crankcase transmission assembly 66 and which is disposed in proximity to an output shaft cavity 89 formed in this casting. A bevel gear 91 is rotatably coupled to the secondary shaft 83 within the cavity 89. The bevel gear 91 is in mesh with a driven bevel gear 92 that is journaled on an output shaft 93. The output shaft 93 is, in turn, journaled by a pair of spaced bearings 94 and 95 for rotation about an axis that extends perpendicularly to the axis of the transmission secondary shaft 83. As a result, the shaft 93 is also perpendicular to the axis of rotation of the crankshaft 79, the axis of the transmission primary shaft 82 and the axis of rotation of the rear axle 26.

An overload release device, indicated generally by the reference numeral 96, couples the driven bevel gear 92 to the output shaft 93 for simultaneous rotation. The overload release device 96 comprises a first annular sleeve 97 that is coupled, by means of a splined connection, for simultaneous rotation with the output shaft 93 contiguous to the bearing 95. A second sleeve 98 is also splined to the output shaft 93 and is positioned in proximity to the bevel gear 92. A coil compression spring 99 is interposed between the sleeves 97, 98, and urges a plurality of projections 101 formed on one end of the sleeve 98 into engagement with corresponding recesses 102 of the bevel gear 92. As a result of this interengagement, the bevel gear 92 is rotatably coupled to the sleeve 98 and, in turn, to the output shaft 93. In the event an obstruction to rotation of the axle 26 of sufficient magnitude is encountered, the projections 101 will be cammed out of the bevel gear recesses 102 to compress the spring 99 and discontinue the driving relationship between the bevel gear 92 and the sleeve 98. Immediately upon removal of the obstruction, the spring 99 will cause the projections 101 to reengage the recesses 102 and reestablish the driving relationship.

As is well known, it is important to establish the desired relationship between bevel gears 91 and 92 so as to insure a good driving relationship, minimize wear and noise. Normally, this adjustment has been effected through the use of shims interposed between the bevel gear and its supporting components. Of course, the use of such shims provides manufacturing difficulties and furthermore can present problems when servicing the transmission. In accordance with this invention, an arrangement is provided that achieves an automatic adjustment of the meshing relationship and its maintenance during operation and when servicing.

A deformable spacer member, indicated generally by the reference numeral 103 is interposed between the inner race of the bearing 95 and a shoulder 104 formed on either the shaft 93, sleeve 97 or as a separate member that is coupled to the shaft 93. The shaft 93 has, at its left hand end as viewed in FIG. 3, an outwardly extending flange 105 that engages a sleeve 106 against which the bevel gear 92 is abuttingly engaged. By moving the shaft 93 axially to the right as seen in FIG. 3, the meshing relationship between the gears 91 and 92 may be established. During this movement, the deformable spacer 103 will be permanently deformed until the desired axial position is reached. Thereafter, the deformable sleeve 103 will be held in its permanently deformed condition and will maintain the spacing between the gears 91 and 92.

In order to couple the shaft 93 to an output member and to achieve the axial deformation of the spacer 103, there is provided a connection to a universal joint 107, which will now be described. The universal joint 107 has an input yoke 108 that has internal splines 109 to provide a driving connection with corresponding splines on the output shaft 93. Means including a nut and washer assembly 111 are threaded onto a threaded end of the output shaft 93 so as to engage the input yoke 108. The input yoke 108 has an inwardly extending shoulder that engages the inner race of the bearing 95. Hence, tightening of the nut 101 will effect axial movement of the shaft 93 to the right as viewed in this figure. This movement will be transmitted, as aforenoted, to move the bevel gear 92 and also so as to deform the deformable spacer 103. When the appropriate position is reached, as may be sensed by the torque necessary to tighten the nut 101, the preestablished meshing relationship will be established and further tightening of the nut 111 is discontinued.

The universal joint 107 is positioned within a hollow interior 112 of the tubular member 31 and is disposed so that its pivot axis is aligned with the pivot axis of the trailing arm assembly 27 as defined by the bearings 34. The forward end of the tubular member 31 extends forwardly of the cross tube 33 and is generally opened. A flexible boot 113 encircles this open end and is sealed to the transmission crankcase assembly 66 so as to protect the internal components including the area 112 and the universal joint 107.

The universal joint 107 has an output yoke 114 that has a splined connection 15 to a drive shaft 116 that extends axially through the tubular member 31 and the tubular sleeve 49 into proximity with the cover 47 of the final drive assembly. The drive shaft 116 has an externally splined rear end portion 117. The splined portion 117 is received within a corresponding female splined portion 118 of a drive yoke 119. The drive yoke 119 is affixed for rotation with a splined shaft 121 of a final drive pinion 122. A nut 123 affixes the yoke 119 to the pinion 122. A coil spring 124 is received within an internal opening of the drive shaft 116 so as to urge the drive shaft 116 in a generally forward direction.

The pinion 122 is rotatably journaled in the final drive cover 47 by means including a ball bearing 125 and a roller bearing 126, which bearings are positioned on opposite sides of the pinion 122. The pinion 122 meshes with a ring gear 127 that is affixed in a suitable manner to a hub 128. The hub 128 is, in turn, rotatably supported by a pair of spaced bearings 129, 131, that are carried in the housing assembly 39 and cover plate 47, respectively. The hub 128 has a splined connection 132 to the axle 26 so as to effect a driving connection between the ring gear 127 and the axle 26.

The engine 65 is provided with a suitable induction system for introducing a fuel/air mixture to the cylinder 76. In addition, an exhaust system including an exhaust pipe 133 extends from a forwardly facing exhaust port to one side of the vehicle 11 and terminates at a combined muffler exhaust pipe 134 that discharges rearwardly.

A braking system may be provided for the rear axle 26 which can include a brake rotor or disc 135 (FIG. 3) that is affixed to a splined portion 136 of the rear axle 26 on the side opposite the ring gear 127. A suitable brake caliper (not shown) can operate with the brake disc 135 to provide braking in a known manner. Of course, various other brake arrangements may be employed.

It should be readily apparent that operation of the engine 65 causes the transmission 66 to be selectively driven through the clutch and at the appropriate speed ratio chosen by selection of the respective gears 85, 86, 87. The transmission secondary shaft 83 then drives the drive shaft 93 through the bevel gears 91, 92. This drive is transmitted through the universal joint assembly 107 to the pinion gear 122, which, in turn, drives the ring gear 127, rear axle 26 and wheels and associated tires 25. During suspension movement, the trailing arm assembly 27 will pivot about the pivot axis defined by the bearings 34. The universal joint 107 permits such suspension movement without affecting the driving relationship. In the event an obstruction to turning of the wheels 25 of sufficient magnitude is encountered, the overload release device 96 will yield so as to prevent any damage to either the transmission 66, final drive, or the engine 65. This overload release mechanism will automatically reengage once the load is removed.

It should be readily apparent that the aforenoted construction provides relatively low unit loading on the rear axle 26 and its supporting bearings 55, 56, due to the extreme outboard location of these bearings. In addition, a relatively simplified arrangement is provided wherein an overload release device is incorporated between the transmission and the final drive without necessitating the provision of additional shafts and drives for them to accommodate such an overload release device. Furthermore, a simplified and improved arrangement is provided for axially locating a rotating element, such as a bevel gear that obviates the necessity for using shims or the like.

Although an embodiment of the invention having a preferred construction has been disclosed, various changes and modifications may be made without departing from the spirit and scope of the invention, as defined by the appended claims.

I claim:

1. In a transmission for a vehicle or the like comprising frame means, at least one front wheel dirigibly carried by said frame means, a pair of rear wheels carried by said frame means, an engine carried by said frame means, and a transmission carried by said frame means, the improvement comprising said engine being positioned with its output shaft extending parallel to the axis of rotation of said rear wheels, said transmission having a primary shaft and a secondary shaft each carrying intermeshing gears for changing the speed ratio between said primary and said secondary shafts, said transmission shafts having their rotational axes extending parallel to the rotational axis of said rear wheels, means for driving said primary shaft from said engine output shaft, a drive shaft for driving said rear wheels and extending generally perpendicular to the axis of rotation of said rear wheels, means for driving said drive shaft from said transmission secondary shaft and an overload release device in the driving connection between said transmission secondary shaft and said rear wheels and remotely from the transmission secondary shaft.

2. In a transmission as set forth in claim 1 wherein the means for driving the drive shaft from the transmission secondary shaft comprises a driving gear affixed to the transmission secondary shaft and a driven gear associated with the drive shaft, the overload release device being positioned between the driven gear and the rear wheels.

3. In a transmission as set forth in claim 2 wherein the overload release device is positioned between the driven gear and the drive shaft.

4. In a transmission as set forth in claim 3 wherein the overload release device comprises positively engaging elements on the driven gear and the drive shaft and biasing means for urging said positively engaging elements into engagement and for permitting release of the driving engagement therebetween upon an overload condition.

5. In a transmission as set forth in claim 1 wherein the means for carrying the rear wheels by the frame means comprises suspension means for permitting suspension travel of the rear wheels relative to the frame means.

6. In a transmission as set forth in claim 5 wherein the suspension means comprises a trailing arm construction pivotally connected at one end thereof to the frame means and carrying an axle at the other end thereof to which the rear wheels are affixed.

7. In a transmission as set forth in claim 6 wherein the trailing arm means comprises a pair of spaced apart arm members, at least one of said arm members being hollow and passing the drive shaft therethrough, there being a universal joint in the drive shaft contiguous to the pivotal axis of the trailing arm member.

8. In a transmission as set forth in claim 7 wherein the means for driving the drive shaft from the transmission secondary shaft comprises a driving gear affixed to the transmission secondary shaft and a driven gear associated with the drive shaft, the overload release device being positioned in the connection between the driven gear and the rear wheels.

9. In a transmission as set forth in claim 8 wherein the overload release device is positioned in the connection between the driven gear and the drive shaft.

10. In a transmission as set forth in claim 9 wherein the overload release device comprises positively engaging elements on the driven gear and the drive shaft and biasing means for urging said positively engaging elements into engagement and for permitting release of the driving engagement therebetween upon an overload condition.

11. In a transmission as set forth in claim 8 wherein the trailing arm means arm members are transversely spaced apart at a relatively substantial distance, the axle being rotatably supported by the trailing arm means by means of a pair of bearing members transversely spaced apart at substantially the width of the trailing arm means.

12. In a transmission as set forth in claim 11 wherein the overload release device is positioned in the connection between the driven gear and the drive shaft.

13. In a transmission as set forth in claim 12 wherein the overload release device comprises positively engaging elements on the driven gear and the drive shaft and biasing means for urging said positively engaging elements into engagement and for permitting release of the driving engagement therebetween upon an overload condition.

14. In a transmission as set forth in claim 6 wherein the trailing arm means includes a pair of widely transversely spaced bearing means rotatably supporting said rear axle.

15. In a transmission as set forth in claim 14 wherein the bearing means comprises a pair of spaced antifriction bearings positioned at the outer periphery of the rear end of the trailing arm means.

16. In a transmission as set forth in claim 15 wherein the trailing arm means comprises a pair of transversely spaced apart trailing arm members.

17. In a transmission as set forth in claim 1 wherein the overload release device comprises positively engaging elements and biasing means for urging said positively engaging elements into engagement and for permitting release of the driving engagement therebetween upon an overload condition.

18. In a transmission as set forth in claim 1 wherein the rear wheels are nonrotatably affixed to an axle, the means for driving the rear wheels comprising meshing gears drivingly connecting the drive shaft to said axle.

19. In a transmission as set forth in claim 18 wherein the meshing gears comprise a ring and pinion gear.

20. In a transmission as set forth in claim 19 wherein the ring gear is drivingly coupled to a sleeve, the rear axle being in splined engagement with said sleeve for driving said rear axle and said sleeve in unison.

21. In a transmission as set forth in claim 20 further including spaced apart bearing means for journaling said sleeve for rotation.

22. In a transmission as set forth in claim 21 wherein the spaced apart bearing means are disposed on opposite sides of the ring gear.

23. In a transmission as set forth in claim 22 further including a housing for encircling the meshing gears and having a cover plate, one of the bearing means being carried by said cover plate and the other of said bearing means being carried by said housing.

24. In a transmission as set forth in claim 1 further including a tubular housing enclosing the drive shaft.

25. In a transmission as set forth in claim 24 further including a flexible boot interposed between one end of said tubular housing and the transmission casing.

26. In a transmission as set forth in claim 25 further including a universal joint drivingly coupling the drive shaft to the transmission secondary shaft.

27. In a transmission as set forth in claim 1 wherein the drive shaft is drivingly coupled to a bevel gear at its input end for driving connection to the transmission secondary shaft and a bevel gear at its output end for driving the rear wheels.

28. In a transmission as set forth in claim 27 further including a universal joint drivingly connecting one of the bevel gears to the drive shaft.

29. In a transmission as set forth in claim 27 wherein the overload release device is interposed between one of the bevel gears and the drive shaft.

30. In a transmission as set forth in claim 29 wherein the overload release device comprises positively engaging elements and biasing means for urging said positively engaging elements into engagement and for permitting release of the driving engagement therebetween upon an overload condition.

31. A transmission as set forth in claim 7 further including a single suspension element interposed between the trailing arm means and the frame means for controlling the movement therebetween.

32. A transmission as set forth in claim 31 wherein the single suspension element comprises a tubular shock absorber and a coil compression spring.

33. A transmission as set forth in claim 32 wherein the line of action of the tubular shock absorber is disposed in a substantially horizontal direction.

* * * * *